US 6,581,813 B2

(12) United States Patent
Bove et al.

(10) Patent No.: US 6,581,813 B2
(45) Date of Patent: Jun. 24, 2003

(54) ROOF-TOP LOAD BASKET

(75) Inventors: Vincent Bove, Fairfield, CT (US);
Justin Sirotin, Seymour, CT (US);
Thomas J. Hanson, Semour, CT (US);
Frederic Clark, Semour, CT (US);
Aidan Petri, Semour, CT (US);
Stephen Lane, Semour, CT (US)

(73) Assignee: Thule, Inc., Seymour, CT (US)

( * ) Notice: Subject to any disclaimer, the term of this patent is extended or adjusted under 35 U.S.C. 154(b) by 0 days.

(21) Appl. No.: 09/682,266

(22) Filed: Aug. 10, 2001

(65) Prior Publication Data
US 2002/0030074 A1 Mar. 14, 2002

Related U.S. Application Data
(60) Provisional application No. 60/224,287, filed on Aug. 10, 2000.

(51) Int. Cl.[7] .................................................. B60R 9/048
(52) U.S. Cl. ........................ 224/324; 224/325; 224/924
(58) Field of Search ................................. 224/324, 325, 224/328, 309, 315, 402, 403, 404, 924

(56) References Cited

U.S. PATENT DOCUMENTS

| | | | | | |
|---|---|---|---|---|---|
| 2,119,051 A | * | 5/1938 | Boeuf | ........................ | 224/325 |
| 2,784,888 A | * | 3/1957 | Lecanu-Deschamps | ..... | 224/325 |
| 3,215,323 A | * | 11/1965 | Bonitt | ........................ | 224/325 |
| 5,303,858 A | * | 4/1994 | Price | ........................ | 224/282 |

FOREIGN PATENT DOCUMENTS

| | | | | | |
|---|---|---|---|---|---|
| DE | 105322 | * | 8/1942 | ................ | 224/324 |
| DE | DT2621683 | * | 12/1977 | ................ | 224/324 |
| FR | 934495 | * | 5/1948 | ................ | 224/324 |

* cited by examiner

Primary Examiner—Stephen K. Cronin
Assistant Examiner—Maerena W. Brevard
(74) Attorney, Agent, or Firm—Howrey Simon Arnold & White LLP

(57) ABSTRACT

A roof-top cargo basket and integrated bicycle carrier system includes a basket configured to hold cargo that is mountable to cross-bars of a vehicle's roof rack system. Load carrier bars are mounted at a top of the basket and extend laterally outboard of the basket for positioning carried bicycles outside of an interior space of said basket. In addition, handles are formed on support members for the load carrier bars to accommodate inspection, loading and unloading of the basket's interior space. For retaining objects within the interior space of the basket, a squeeze bar is disposed at or near an end portion of the basket. The load carrier bars are configured to receive a rooftop bicycle carrier for attachment thereto at locations laterally outside the interior space of the basket.

17 Claims, 3 Drawing Sheets ained and to extend beyond the invention herein disclosed. It is our intention to encompass all such modifications as come within the scope and spirit of the appended claims.

ROOF-TOP LOAD BASKET

CROSS REFERENCE TO RELATED APPLICATIONS

This patent application claims the benefit of U.S. Provisional Application No. 60/224,287 filed Aug. 10, 2000, and entitled "Roof-Top Load Basket;" the same is expressly incorporated herein, in its entirety, by this reference.

BACKGROUND OF INVENTION

1. Technical Field

The present invention relates generally to load carriers. More specifically, the invention relates to roof-top sport equipment, and particularly bicycle carriers, and especially those having associated basket structures for carrying other gear.

2. Background of the Invention

Vehicle roof-top basket-style cargo carrier systems are known, even in combination with sport equipment carrying capabilities. Such known carriers, however, position the load bars so that portions of the bicycle, such as the tires and wheels, are positioned in the interior space of the basket. In this manner, a substantial entirety of the cargo space of the basket is utilized by the bicycles and is prevented from being used for carrying other items.

In another aspect, known combination basket and bicycle carriers position the bicycles in such a manner that fluids draining therefrom, such as rain water and chain oil, drip directly into the cargo space of the basket unnecessarily soiling the cargo carried in the basket.

In view of the above described deficiencies associated with roof mount basket carriers, the present invention has been developed to alleviate these drawbacks and provide further benefits to the user. These enhancements and benefits are described in greater detail hereinbelow with respect to several alternative embodiments of the present invention.

SUMMARY OF INVENTION

In general terms, the present invention provides both roof-top cargo carrying capabilities, together with sport equipment capabilities, while avoiding the drawbacks described above that are incumbent upon convention designs for such combinations. Among other benefits, the sport equipment pieces, typically bicycles, are positioned laterally outside of the cargo carrying space so that dirty drips fall to the sides of any cargo that would otherwise be soiled. In another aspect, select structural elements of the cargo basket are configured and adapted to provide aid to a user in the loading of equipment and cargo onto the roof-top carrier arrangement.

In one particular embodiment of the present invention, a roof-top cargo basket and integrated bicycle carrier system is provided that includes a basket configured to hold cargo that is mountable, for example, to cross-bars or rails of a vehicular roof rack system. Load carrier bars are mounted at the top of the basket and extend laterally outboard of the basket for positioning carried bicycles outside of the interior space of the basket. In addition, handles are formed on support members for the load carrier bars to accommodate loading and unloading of the basket's interior space, as well as inspection of the load thereafter. The basket is formed of a cross pattern of longitudinal and lateral basket body members that establish an interior space of the basket. In order to avoid small items falling through openings in the basket, a cross pattern of supplemental restraints may be configured to define a mesh grating having a plurality of relatively small mesh apertures.

For retaining objects within the interior space of the basket, one or more squeeze bars are disposed at or near an end portion of the basket. Each squeeze bar is provided with end connectors on each of its opposing ends to accommodate sliding or reciprocating motion of the squeeze bar within the interior space of the basket. In addition, each end connector has an engagement mechanism for releasably restraining the squeeze bar at selected locations relative to the longitudinal basket body members. The load carrier bars mounted at the top of the basket include, for example, one or more forward and one or more rearward load bars. Further, either or both of the load carrier bars can extend over and laterally outboard of the basket, or either or both can extend only laterally outboard of the basket without extending over the interior space of the basket. The load carrier bars are configured to receive a rooftop sport equipment (bicycle) carrier for attachment thereto at locations preferably laterally outside the interior space of the basket. Handles formed on support members for the load carrier bars are preferably formed at hand hold positions of the out-rigger support members.

The beneficial effects described above apply generally to the exemplary devices and mechanisms disclosed herein for a combination cargo carrier and sport equipment carrier in combination. The specific structures through which these benefits are delivered will be described in greater detail hereinbelow.

BRIEF DESCRIPTION OF DRAWINGS

The invention will now be described in greater detail in the following way of example only and with reference to the attached drawings, in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a basis for the claim(s) and as a representative basis for teaching one skilled in the art to variously employ the present invention.

Figure 1:
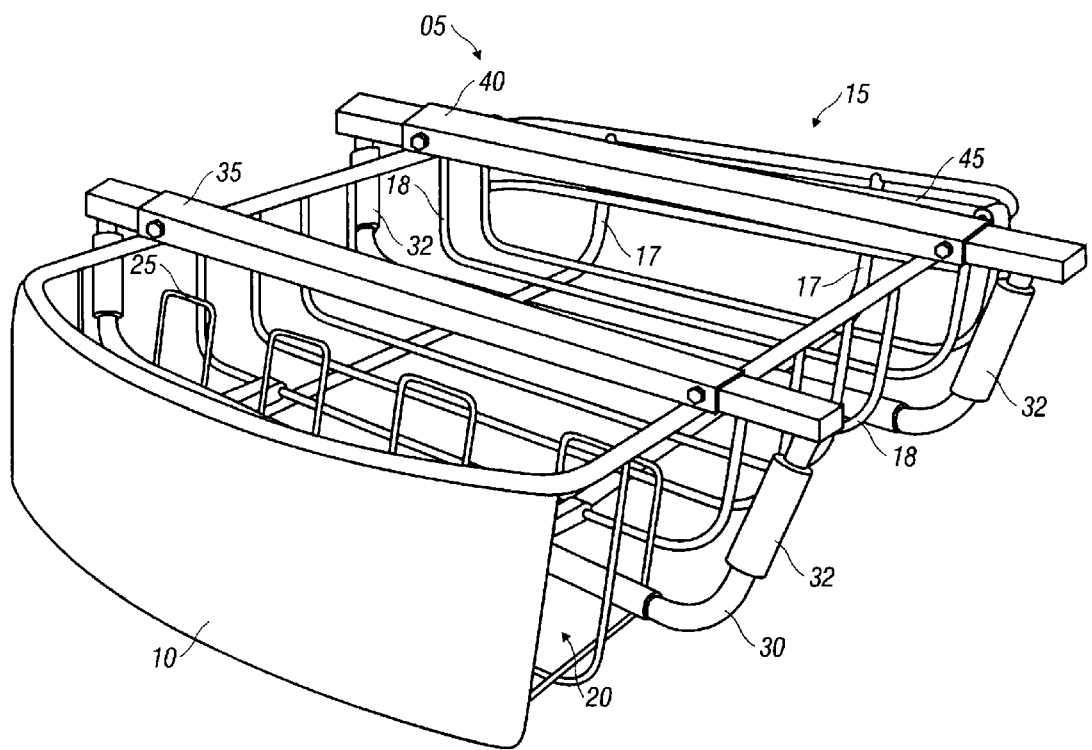
FIG. 1 is a perspective view of an exemplary embodiment of a roof-top cargo carrier basket of the present invention having fully extending load carrier bars incorporated thereabove.
Figure 2:
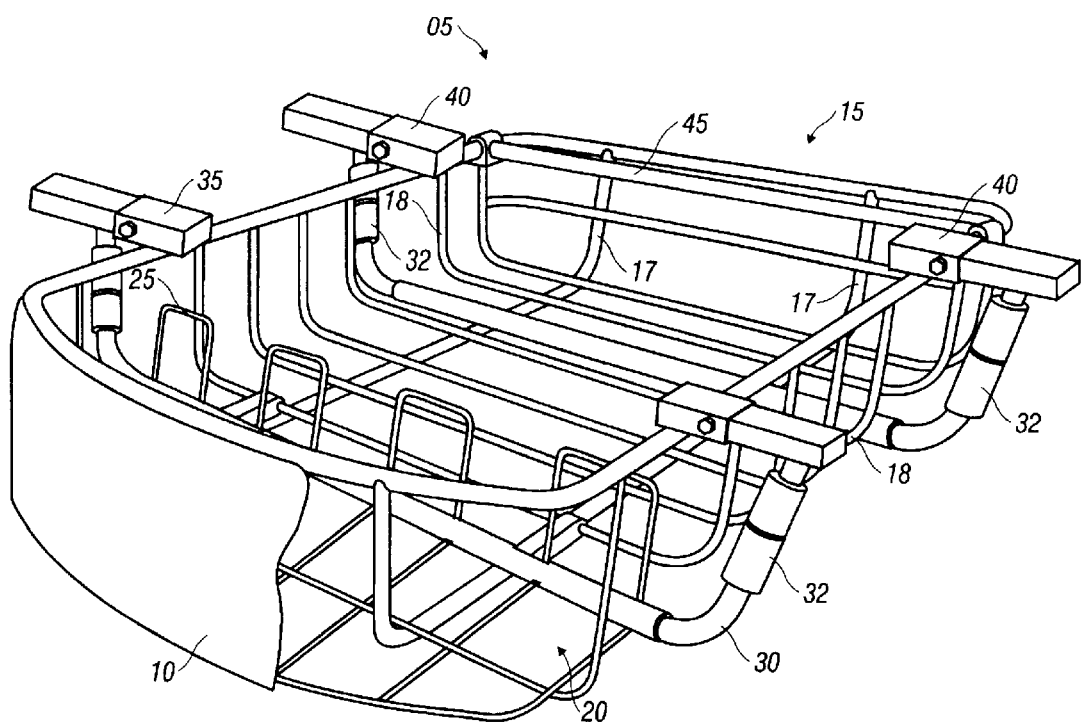
FIG. 2 is a perspective view of an example of an alternate embodiment of the cargo carrier basket having load bars incorporated only laterally thereof and showing the wind deflector partially cut away to expose additional features of the cargo basket

Referring to the Figures and using like reference numerals to identify like parts throughout the several views, FIG. 1 shows a roof-top basket load carrier 05 adapted to be mounted to a vehicle's rack system, and particularly to cross-bars 70 of the vehicle's rack. FIG. 2 shows an alternate embodiment of the carrier basket 05 in which forward 35 and rearward 40 load bars extend only laterally outside the basket 05.

As may be appreciated from the illustrations of FIGS. 1 and 2, the cargo basket 05 is formed of basket body members 15 that include both longitudinally oriented members 17 and laterally oriented members 18. Together, these members' cross-pattern establishes the basket's 05 interior The basket 05 is provided in conjunction with a sport equipment carrier arrangement because it is often desired or required to carry other equipment, gear and cargo on sport excursions in volumes that exceed the regular cargo carrying capacity of the transporting vehicle. An example would be a camping trip on which bicycles are taken together a substantial amount of camping gear that can not be conveniently fit into the carrying spaces of the vehicle.

As opposed to traditional designs, the present invention repositions at least the lower extremities of the bicycles, such as the tires and wheels, outside the basket. This is enabled by forward 35 and rearward 40 load bars that extend across and laterally outside the basket 05 as shown in FIG. 1, or only laterally outside the basket 05 as shown in FIG. 2. In this way, conventional rooftop bicycle carriers adapted to be secured to such load carrier bars 35,40 may be affixed thereto at locations laterally outside the basket. In this manner, the interior space of the basket is preserved for other cargo. Still further, recently ridden bicycles oftentimes have dirty fluids draining therefrom which is not desired to be dripped directly on other stowed cargo; this outboard configuration facilitates these goals of the user.

The out-rigger supports 30 provided for the mounting of the cross bars 35,40 conveniently establish hand hold 32 positions which facilitate a user's loading and unloading of items into and out of the cargo basket 05. Because of the fortitude which must be included to adequately support the cross bars 35,40, the out-rigger supports 30 are constructed of sufficient strength to support such pulling by a user. This has been discovered to be a great accommodation to those persons desiring to inspect the load in the basket 05, as well as facilitate the loading and unloading processes. This is a particularly important feature when considering today's popular sport utility vehicles (SUV). Normally, the roof of such SUVs is at a substantial elevation, and only the tallest of persons are able to unassistedly inspect the space occupied by the cargo basket of the present invention. More typically, the person will be stepping on a running board of the vehicle and require a hand-hold at or near the basket's elevation for balance and support during the inspection process. The supports 30 provide and facilitate just such a function.

The inclusion of the outboard mounting and hand hold arrangements does, however, make the overall basket arrangement 05 substantially wider than without their inclusion. This greater width can be detrimental in some respects, especially when it comes to storing the basket when not being utilized. To minimize this drawback, the outboard mounting and hand hold arrangements have been designed to be removable. As shown in FIGS. 1 and 2, this is exemplarily accomplished using a tab insertion or telescoping connective arrangement. The insertible portion is sized slightly smaller than the receiving portion and a securement mechanism, such as a bolt, or other locking-type arrangement is included for restraining and releasing the connecting portions.

Another deficiency which has been recognized as being common to traditional configurations of such basket-type roof racks is that the interior space is rarely partitioned and is oftentimes not suited for carrying small objects because of their easy passage through the grating established by the crossed basket body members 17,18. The present invention accommodates such small item storage by providing a small cargo restraining arrangement 25 that establishes a small cargo space 20 at the front of the basket 05 immediately behind the front faring or wind deflector 10. The restraining arrangement 25 is shown as a semi-flexible bent wire which is used to segregate small cargo items into the partitioned space 20 defined thereby. As an option, but which is not shown, a securing net may be additionally provided for restraining small articles within this smaller partitioned cargo space Similar results may be obtained by defining the partitioned space 20 using smaller mesh Still further, the partitioned space 20 may be located in other areas of the basket 05, depending upon the position and configuration of the retraining arrangement 25.

In a similar vein, squeeze bar 45 is exemplarily shown as being provided at the rear portion of the basket 05 for retaining larger objects within the primary compartment of the basket 05. End connections for the bar 45 are provided that accommodate sliding or reciprocating motion of the squeeze bars 45 within the basket's 05 interior space. Engagement mechanisms are provided at the connectors for releasably restraining the bar 45 at selected locations relative to the supporting longitudinal basket body members 17. An example of such engagement mechanisms would be ratchet attachments that engage upon teeth fixed to the support member 17 thereby enabling opposite direction. Another example would be friction fittings, such as abutting winged screws or bolts that are carried on the bar 45 and which can be manually engaged and release upon the support member 17. A more simple solution is merely a friction fit member, exemplarily constructed from a semi-rigid material such as plastic, that fit sufficiently tightly about the support member 17 so that it must be forceably moved by an operator for position changes. Otherwise, under normal operating conditions, the bar 45 will remain fixed relative to the basket 05.

The bar 45 is constructed to be sufficiently strong to act as a supporting cross-bar for a sport equipment rack to be mounted thereupon in like manner as to a cross member of a roof top rack system of the carrying vehicle. In other words, one or more squeeze bar(s) 45 can be utilized to replicate the now basket-covered, cross-bar containing rack system of the transporting vehicle. As an example, a ski-rack that is adapted to be mounted to the round cross-bar(s) of a vehicle rack can now be mounted to properly positioned squeeze bars 45 on the rack 05.

An alternative configuration to the friction fit engagement mechanism is a locking arrangement. This locking arrangement can be variously configured as will be understood by those persons skilled in these arts, but what is important is the locking/unlocking feature itself. As in all carrier designs, the ability to limit disengagement of the various components from the mounted configuration is of utmost importance, therefore the ability of the present invention to incorporate a lockable connection between the squeeze bar 45 and the basket 05 is a highly desired feature. As an example, a locking mechanism may be fixed to each of the ends of the squeeze bar 45. The locking mechanism may include two ears, one each for opposed location about a longitudinal running bar 17 of the basket 05 for a locking friction fit thereabout. The locking mechanism may be of a cam-type similar to that shown in FIG. 3, or any other suitable tightening and locking arrangement in this embodiment.

In use, the bar 45 may be "snugged up" against a larger item(s) to be restrained within the interior of the basket 05; an example would be a barbeque pit that is too large to fit into the small space, but sufficiently small that restraint is required in the larger space of the basket to prevent movement or possible loss during transport.

Figure 3:
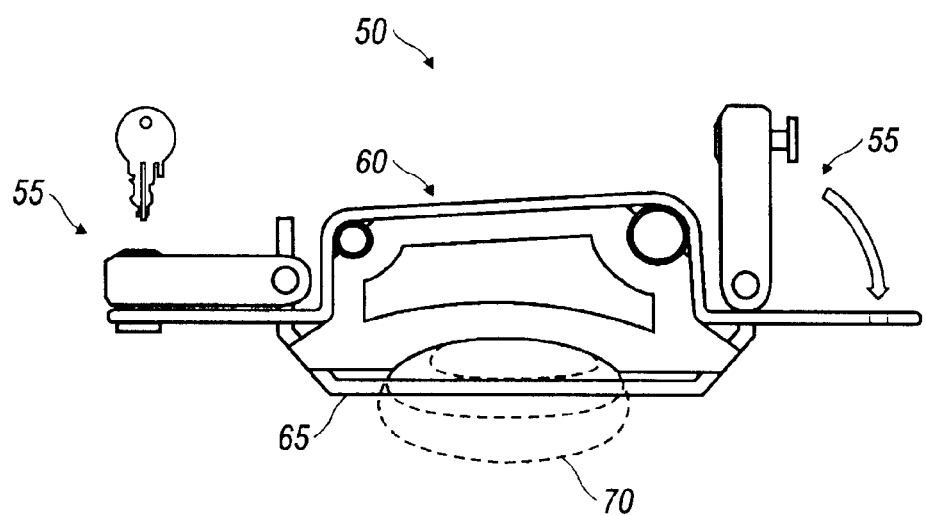
FIG. 3 is a side elevational view of an example of an attachment arrangement that can be utilized to mount the cargo basket to a carrying vehicle's roof-top rack system.

FIG. 3 shows an exemplary configuration of a locking mount 50 utilized to secure the basket 05 to cross bars 70 of the vehicle's roof rack system. The mounts 50 take the form of clamping mechanisms that each include both upper clamp member(s) 60 and lower clamp member(s) 65. The upper clamp member(s) 60 is configured in the illustrated embodiment to simultaneously restrain two laterally oriented members of the basket 05; exemplarily, one of the tubular members 30 and an adjacent member 18. As shown by end view, these tubes 30,18 can be, and often are of different diameters. This ability to restrain more than one basket member, as well as differently configured basket members is also an important feature of the present invention in that it enhances the versatility and applicability of the combination invention.

Locking cams 55 may be utilized for tightening down the clamps, as well as locking the mounting closed about the cross-bar 70 of the vehicle's rack system. In the illustration of FIG. 3, three possible sizes of such cross-bars 70 are shown using dashed lines. Because of the ability to use differently configured lower clamping member(s) 65, differently sized and configured bars 70 can be easily accommodated. The same lower clamping member(s) 65 can also be adapted to facilitate different extension lengths below the body of the locking mount 50. As an example, the ends of the member 65 may be threaded and the locking cams 55 connected thereto by a threaded barrel nut upon which the body of the cam 55 is engaged. In this manner, this threaded connection can be utilized for macro size adjustments, with the throw of the cam 55 being used for uniform tightening purposes upon the bar 70.

This connection also makes it possible to accommodate different tubular 30,18 configurations. For more extreme cases, different clamping members 60 may be exchanged, but for less extreme differences, the relative threaded connection between the clamping member 65 may be used. Similarly, the interior insert shown to abut against the interior portions of the members 30,18 may be constructed from substantially rigid material that can be exchanged to accommodate different member 30,18 configurations, or the interior insert may be constructed form sufficiently pliable material that conforms to various configurations, at least adjacent to the members 30,18, and serves as a buffer for engagement with the cross-bar 70 of the vehicle's rack system.

The interchangeable nature of the several components of the locking mount 50 make it possible, with a limited number of components, to interchangeably supply a substantially universal mounting kit that can accommodate differently configured baskets, as well as differently configured vehicle rack systems that are diverse in such was as having either round, square or aerodynamically designed cross-bars 70.

As illustrated, two locking cams are shown. It should be appreciated, however, that one lockable cam may be utilized, with a hinged or pivot connection configured oppositely thereto. In the illustrated embodiment, the locking feature is accomplished by providing a lock cylinder in the cam lock's body that is releasably securable to another body member of the mounting assembly and which may only be actuated using a key.

A roof-top basket style load carrier having unique and beneficial features has been described herein. These and other variations which will be appreciated by those skilled in the art are considered to be within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A roof-top cargo basket and integrated bicycle carrier system comprising:
   a basket mountable to a vehicle's roof rack system and configured to hold cargo;
   load carrier bars mounted at a top of said basket and extending laterally outboard of said basket for positioning carried bicycles laterally outside of an interior space of said basket;
   handles formed on support members for said load carrier bars for accommodating inspection, loading and unloading of said basket's interior space; and
   a squeeze bar disposed proximate an end portion of the basket for retaining objects within the interior space of the basket.

2. The roof-top cargo basket and integrated bicycle carrier system of claim 1, wherein said basket is configured to be mounted to cross-bars of the vehicle's roof rack system.

3. The roof-top cargo basket and integrated bicycle carrier system of claim 1, wherein the basket further comprises a cross pattern of longitudinal and lateral basket body members that establishes an interior space of the basket.

4. The roof-top cargo basket and integrated bicycle carrier system of claim 3, wherein the cross pattern of longitudinal and lateral basket body members define a mesh grating having a plurality of mesh apertures.

5. The roof-top cargo basket and integrated bicycle carrier system of claim 1, further comprising end connectors disposed on opposing ends of the squeeze bar to accommodate reciprocating motion of the squeeze bar within the interior space of the basket.

6. The roof-top cargo basket and integrated bicycle carrier system of claim 5, further comprising an engagement mechanism on each end connector for releasably restraining the squeeze bar at select locations relative to longitudinal basket body members.

7. The roof-top cargo basket and integrated bicycle carrier system of claim 1, wherein the load carrier bars further comprise at least one forward load bar and at least one rearward load bar.

8. The roof-top cargo basket and integrated bicycle carrier system of claim 7, wherein at least one of the forward load bar and the rearward load bar extends over and laterally outboard of the basket.

9. The roof-top cargo basket and integrated bicycle carrier system of claim 8, wherein both the forward load bar and the rearward load bar extend over and laterally outboard of the basket.

10. The roof-top cargo basket and integrated bicycle carrier system of claim 7, wherein at least one of the forward load bar and the rearward load bar extends only laterally outboard of the basket.

11. The roof-top cargo basket and integrated bicycle carrier system of claim 10, wherein both the forward load bar and the rearward load bar extend only laterally outboard of the basket.

12. The roof-top cargo basket and integrated bicycle carrier system of claim 1, wherein the load carrier bars are configured to receive a rooftop bicycle carrier for attachment thereto at locations laterally outside the interior space of the basket.

13. The roof-top cargo basket and integrated bicycle carrier system of claim 1, wherein the handles are formed on hand hold positions of out-rigger support members for said load carrier bars.

14. The roof-top cargo basket and integrated bicycle carrier system of claim 1, wherein out-rigger support members for said load carrier bars are configured to be releasably engaged upon said basket thereby enabling a reduction in a width of the roof-top cargo basket and integrated bicycle carrier system when said out-rigger support members are disengaged.

15. The roof-top cargo basket and integrated bicycle carrier system of claim 1, further comprising locking mounts configured to secure the basket to the vehicle's roof rack system.

16. A roof-top cargo basket and integrated sport equipment carrier system comprising:

a basket configured to hold cargo and be mounted to a vehicle's roof rack system;

a load carrier bar mounted at a top of said basket and extending outboard of said basket for positioning carried sports equipment laterally outside of an interior space of said basket;

an out-rigger support member coupleable to said load carrier bar and configured to be releasably engaged upon said basket thereby enabling a reduction in width of the roof-top cargo basket when said out-rigger support members are disengaged; and said out-rigger support member being telescopically coupled to said load carrier bar and to said basket.

17. The roof-top cargo basket and integrated sport equipment carrier system of claim 16, further comprising:

a handle formed on said out-rigger support member for said load carrier bar for accommodating inspection, loading and unloading of said basket's interior space.

* * * * *